United States Patent
Nagasawa et al.

(10) Patent No.: US 6,920,035 B2
(45) Date of Patent: Jul. 19, 2005

(54) THIN-TYPE SURFACE-MOUNT CAPACITOR

(75) Inventors: Toshihisa Nagasawa, Toyama (JP); Akihiro Kawai, Toyama (JP); Yuichi Maruko, Toyama (JP)

(73) Assignees: Nec Tokin Corporation, Sendai (JP); Nec Tokin Toyama, Ltd., Shimoniikawa-gun (JP)

(*) Notice: Subject to any disclaimer, the term of this patent is extended or adjusted under 35 U.S.C. 154(b) by 0 days.

(21) Appl. No.: 10/891,203

(22) Filed: Jul. 13, 2004

(65) Prior Publication Data
US 2005/0013093 A1 Jan. 20, 2005

(30) Foreign Application Priority Data
Jul. 14, 2003 (JP) ........................................ 2003-274156

(51) Int. Cl.⁷ .................................................. H01G 9/00
(52) U.S. Cl. ........................ 361/523; 361/532; 361/525; 29/25.03
(58) Field of Search ................................ 361/523, 525, 361/526, 531, 532; 29/25.03

(56) References Cited

U.S. PATENT DOCUMENTS

| 5,424,907 | A | * | 6/1995 | Kojima et al. | ............. | 361/532 |
| 6,392,869 | B2 | * | 5/2002 | Shiraishi et al. | ............ | 361/523 |
| 6,462,936 | B1 | * | 10/2002 | Fujimoto et al. | ........... | 361/525 |
| 6,594,141 | B2 | * | 7/2003 | Takada | ....................... | 361/523 |
| 6,850,406 | B2 | * | 2/2005 | Asami et al. | ............... | 361/528 |

FOREIGN PATENT DOCUMENTS

| JP | 5-275290 A | 10/1993 |
| JP | 2002-313676 A | 4/2004 |

* cited by examiner

*Primary Examiner*—Anthony Dinkins
(74) *Attorney, Agent, or Firm*—Frishauf, Holtz, Goodman & Chick, P.C.

(57) ABSTRACT

A thin-type surface-mount capacitor is a solid electrolytic capacitor. The capacitor includes a capacitor element having an anode body in the form of a plate-like or foil-like valve-action metal that is area-increased, and a conductive functional polymer film used as a solid electrolyte. The capacitor further includes thermal adhesive insulating resin impregnated tapes that are stuck to the capacitor element on upper and lower sides thereof, and an element reinforcing metal plate and a solderable cathode terminal metal plate 67 that are stuck to the tapes, respectively. The capacitor is finally formed by applying a curing treatment under high temperature and pressure. Each of the metal plates is applied with a stepping process that provides a difference in level corresponding to a predetermined thickness.

11 Claims, 2 Drawing Sheets

THIN-TYPE SURFACE-MOUNT CAPACITOR

This application claims priority to Japanese Patent Application JP 2003-274156, the disclosure of which is incorporated herein by reference.

BACKGROUND OF THE INVENTION

This invention relates to a solid electrolytic capacitor using a polymer as an electrolyte and, more specifically, relates to a thin-type surface-mount capacitor.

As capacitors of this type, there have been known those capacitors described in, for example, Japanese Patent Application Publication (JP-A) H05-275290 (hereinafter, the capacitor described in this publication will be referred to as the solid electrolytic capacitor according to the prior art 1) and Japanese Patent Application Publication (JP-A) 2002-313676 (hereinafter, the capacitor described in this publication will be referred to as the solid electrolytic capacitor according to the prior art 2).

The solid electrolytic capacitor according to the prior art 1 is called the two-terminal mold type. In this capacitor, a conductive functional polymer film is used as a solid electrolyte. The conductive functional polymer film is formed on an anode oxide film of a valve-action metal anode body so as to cover one end portion of the anode body, and a conductive layer is further formed around the conductive functional polymer film, thereby to form a cathode layer. Leads are connected to the anode body and the cathode layer and drawn therefrom to a lower side to expose their end portions. Thereafter, the composite of the foregoing components is overmolded with a casing resin so that a surface-mount type capacitor is formed.

The solid electrolytic capacitor according to the prior art 2 is called the three-terminal transmission line element type that is directly connected to a power circuit so that the current flows inside. In this capacitor, like the prior art 1, a conductive functional polymer film is used as a solid electrolyte. The conductive functional polymer film is formed on an anode oxide film of a valve-action metal anode body so as to cover a central portion thereof, and a conductive layer is further formed around the conductive functional polymer film, thereby to form a cathode layer. Anode terminals are respectively joined to both ends of the anode body, and the cathode layer is covered with a thermal adhesive resin impregnated tape having a through hole. After filling the through hole with a conductive paste, a cathode terminal metal plate covers the tape including the conductive paste so as to form a cathode terminal. In this manner, a surface-mount type capacitor is formed.

In the two-terminal mold type solid electrolytic capacitor according to the prior art 1, invasion of oxygen is prevented by molding of the casing resin. However, by means of the molding, it is difficult to increase adhesion between an anode terminal and the casing resin for tightly sealing therebetween. Oxygen in the atmosphere may enter the inside of the capacitor from a joining portion between the anode terminal and the casing resin to thereby oxidize the conductive functional polymer film. Therefore, the preventive measure against the invasion of oxygen is not sufficient. Further, the structure of this capacitor also has a drawback that the size increases.

For solving such a problem, it may be considered to apply gold plating to the terminal or inject a sealing agent. However, this causes an increase in production cost.

On the other hand, in the three-terminal transmission line element type solid electrolytic capacitor according to the prior art 2, there is a large gap between an element reinforcing metal plate and the cathode terminal metal plate, and further, the area of the thermal adhesive resin impregnated tape on the cathode terminal side is equal to or smaller than the area of the cathode layer. Therefore, the thermal adhesive resin impregnated tape does not fully cover the cathode layer including the conductive functional polymer film, and thus there are exposed portions to easily allow invasion of oxygen. Accordingly, like the prior art 1, the prior art 2 also has a drawback that the electrolyte layer in the form of the conductive functional polymer film is liable to be oxidized.

SUMMARY OF THE INVENTION

It is therefore an object of this invention to provide a non-cased thin-type surface-mount capacitor that can inhibit invasion of oxygen into the inside of the capacitor, and that is reliable and excellent in high-temperature durability.

According to a first aspect of this invention, there is obtained a thin-type surface-mount capacitor comprising a capacitor element comprising an anode body in the form of a plate-like or foil-like valve-action metal that is area-increased, and a cathode layer including a solid electrolyte in the form of a conductive functional polymer film; thermal adhesive insulating resin impregnated tapes provided on both sides of the capacitor element, respectively; and an element reinforcing metal plate and a solderable cathode terminal metal plate that are stuck to the thermal adhesive insulating resin impregnated tapes, respectively, wherein a thermal adhesive insulating resin of the thermal adhesive insulating resin impregnated tapes is cured under high temperature and pressure, and wherein end portions of the element reinforcing metal plate located outward of the cathode layer and corresponding to the anode body are applied with a stepping process that provides a difference in level corresponding to a substantial thickness of the cathode layer.

In the first aspect of this invention, it is preferable that end portions of the cathode terminal metal plate located outward of the cathode layer and corresponding to the anode body be applied with a stepping process that provides a difference in level corresponding to a substantial thickness of the cathode layer.

According to a second aspect of this invention, there is obtained a method of producing a thin-type surface-mount capacitor, comprising the steps of forming a capacitor element by using as an anode body a plate-like or foil-like valve-action metal that is area-increased, and by forming a cathode layer including a solid electrolyte being a conductive functional polymer; sticking thermal adhesive insulating resin impregnated tapes to the capacitor element on both sides thereof, respectively; sticking an element reinforcing metal plate and a solderable cathode terminal metal plate to the thermal adhesive insulating resin impregnated tapes, respectively; applying a stepping process to portions of the element reinforcing metal plate located at outer ends of the cathode layer and corresponding to the anode body for providing a difference in level corresponding to a substantial thickness of the cathode layer; and curing a thermal adhesive insulating resin of the thermal adhesive insulating resin impregnated tapes under high temperature and pressure.

In the second aspect of this invention, it is preferable that the step of applying a stepping process further apply a stepping process to portions of the cathode terminal metal plate located at outer ends of the cathode layer and corresponding to the anode body for providing a difference in level corresponding to a substantial thickness of the cathode layer.

DESCRIPTION OF THE PREFERRED EMBODIMENT

For facilitating better understanding of this invention, the conventional surface-mount type capacitors will first be described with reference to FIGS. 1 and 2.

Figure 1:
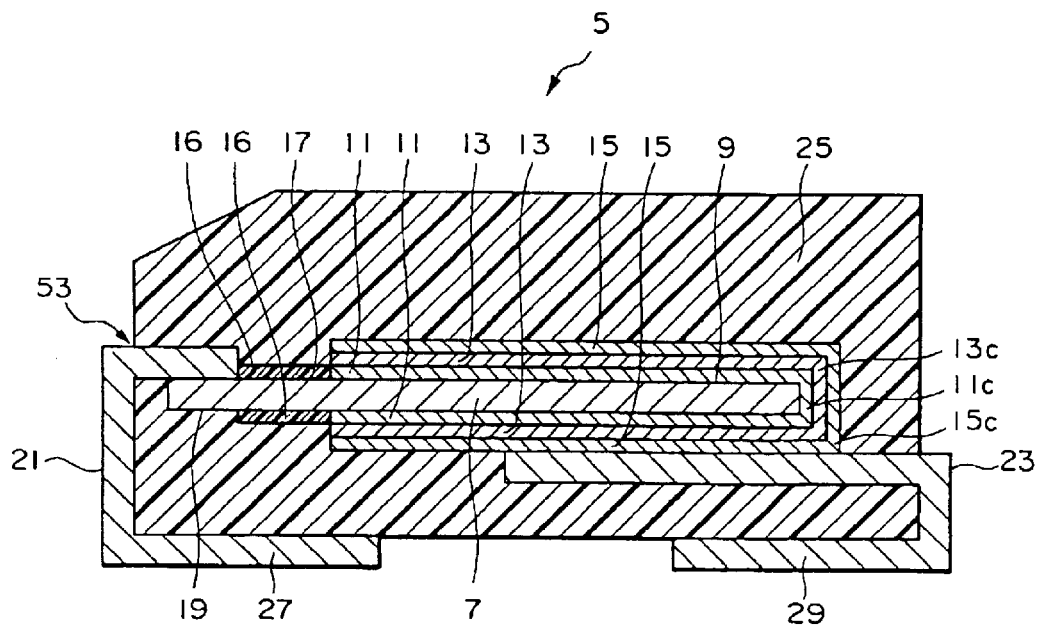
FIG. 1 is a sectional view of a solid electrolytic capacitor according to the prior art 1.

FIG. 1 shows a solid electrolytic capacitor 5 according to the prior art 1. The illustrated capacitor 5 is called the two-terminal mold type. In the capacitor 5, a conductive functional polymer film 11 is used as a solid electrolyte, and a valve-action metal anode body 7 comprises a foil of aluminum being a valve-action metal and an anode oxide film formed on the aluminum foil.

On the anode oxide film, the conductive functional polymer film 11 is formed at a portion 9 of the anode body 7 so as to cover one end thereof. Further, a graphite layer 13 is formed around the conductive functional polymer film 11, and a conductive layer 15 in the form of a silver paste layer is formed around the graphite layer 13. Then, at the other end 19 of the anode body 7 on an upper side thereof, a lead 21 is connected so as to be continuous with a portion 17 of the anode body 7 where a resist layer 16 is formed, and is drawn out therefrom. Further, a lead 23 is connected to a lower side of the conductive layer 15 and drawn out therefrom. Thereafter, the composite of the foregoing components is overmolded with a casing resin (mold resin) 25 so that the capacitor 5 is formed.

Herein, the cathode of the capacitor 5 is comprised of the conductive functional polymer film 11, the graphite layer 13 and the conductive layer 15 in the form of the silver paste layer, which are formed on the conductive functional polymer film 11. In the following description, for convenience' sake, the thickness of a cathode layer is defined as a thickness representing the sum of thicknesses of the conductive functional polymer film 11, the graphite layer 13, and the silver paste layer (conductive layer) 15. In FIG. 1, symbols 11c, 13c, and 15c denote end portions of the conductive functional polymer film 11, the graphite layer 13, and the conductive layer 15, respectively.

In the capacitor 5 illustrated in FIG. 1, an inner side at one end of a ⊐-shaped anode terminal 27 is joined as a lead terminal to the upper side of the anode body 7, while an upper side at one end of a ⊐-shaped cathode terminal 29 is joined as a lead terminal to the lower side of the conductive layer 15, and the anode and cathode terminals 27 and 29 are drawn out therefrom such that lateral and bottom portions of the anode terminal 27 and lateral and bottom portions of the cathode terminal 29 are respectively exposed to the outside. In this manner, the capacitor 5 is formed as a surface-mount type capacitor having the mounting terminal portions at the bottom.

In the following description, a capacitor element or simply an element represents a structural body in which the conductive functional polymer film 11, the graphite layer 13, and the conductive layer 15 in the form of the silver paste layer are formed on part of the anode body 7 in the order named.

In the two-terminal mold type solid electrolytic capacitor 5 according to the prior art 1, invasion of oxygen is prevented by molding of the mold resin 25 being an epoxy resin. However, by means of the molding, it is difficult to increase adhesion between the anode terminal 27 and the mold resin 25 for tightly sealing therebetween. For example, oxygen in the atmosphere may enter the inside of the capacitor 5 from a joining portion between the anode terminal 27 and the mold resin 25 as indicated by an arrow 53 to thereby oxidize the conductive functional polymer film 11. Therefore, the preventive measure against the invasion of oxygen is not sufficient. Further, the structure of the capacitor 5 also has a drawback that the size increases.

For solving such a problem, it may be considered to apply gold plating to the terminals or inject a sealing agent. However, this causes an increase in production cost.

Figure 2:
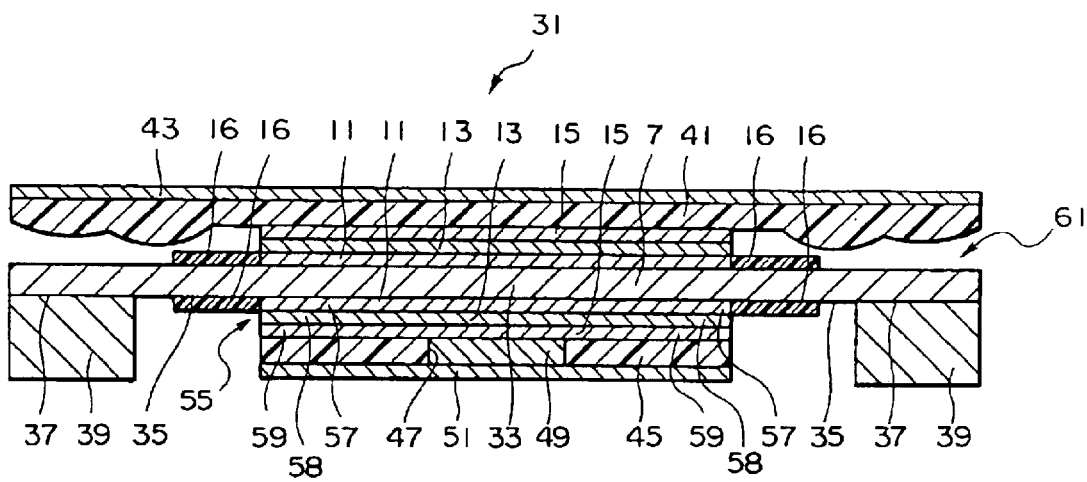
FIG. 2 is a sectional view of a solid electrolytic capacitor according to the prior art 2.

FIG. 2 shows a solid electrolytic capacitor 31 according to the prior art 2. The illustrated capacitor 31 is called the three-terminal transmission line element type having three connection terminals. In the capacitor 31, a conductive functional polymer film 11 is used as a solid electrolyte, and a valve-action metal anode body 7 comprises a valve-action metal plate and an anode oxide film formed on the valve-action metal plate. The conductive functional polymer film 11 is formed on the anode oxide film so as to cover a central portion 33 thereof, and a graphite layer 13 is formed around the conductive functional polymer film 11. Further, a silver paste layer is formed as a conductive layer 15 of the cathode around the graphite layer 13. Thereafter, anode terminal metal plates are respectively joined to both ends 37, 37 of the anode body 7 extending outward via portions 35 of the anode body 7 where resist layers 16, 16 are formed. These anode terminal metal plates serve as anode terminals 39, 39, respectively. A thermal adhesive resin impregnated tape 41 is provided to cover the conductive layer 15 on an upper side thereof, and a reinforcing metal plate 43 is further provided to cover the tape 41 on an upper side thereof. A thermal adhesive resin impregnated tape 45 is provided to cover the conductive layer 15 on a lower side thereof. The tape 45 is formed with a through hole 47 where a conductive paste 49 is filled. Thereafter, a cathode terminal metal plate 51 is provided to cover the tape 45 including the conductive paste 49 so as to serve as a cathode terminal. In this manner, the capacitor 31 is formed as a surface-mount type capacitor.

In the three-terminal transmission line element type solid electrolytic capacitor 31 according to the prior art 2, there is a large gap between the reinforcing metal plate 43 and the cathode terminal metal plate 51, and further, the area of the tape 45 on the cathode terminal side is equal to or smaller than the area of the cathode layer of the element.

Therefore, for example, as indicated by symbol 55 in FIG. 2, the tape 45 does not fully cover ends 57, 57 of the conductive functional polymer film 11, ends 58, 58 of the graphite layer 13, and ends 59, 59 of the silver paste layer (conductive layer 15), and thus the element cathode layer has exposed portions to easily allow invasion of oxygen. Further, invasion of oxygen is easy also at a portion identified by symbol 61. Accordingly, like the prior art 1, the prior art 2 also has a drawback that the electrolyte layer in the form of the conductive functional polymer film 11 is liable to be oxidized.

Hereinbelow, a preferred embodiment of this invention will be described with reference to FIG. 3.

Figure 3:
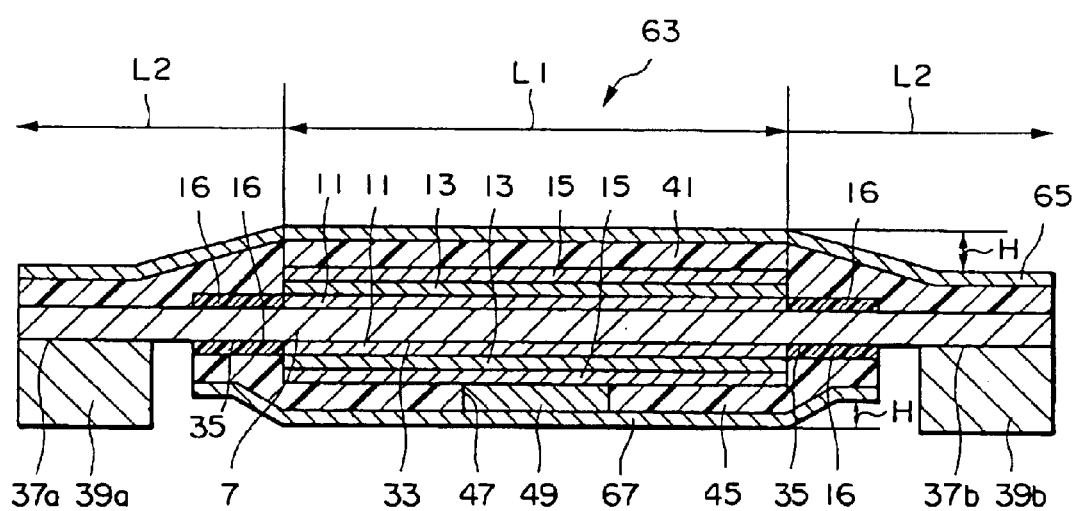
FIG. 3 is a sectional view of a solid electrolytic capacitor according to a preferred embodiment of this invention.

FIG. 3 shows a thin-type surface-mount capacitor 63 according to the embodiment of this invention. The illustrated capacitor 63 is a rectangular plate-like solid electrolytic capacitor. Like the capacitor 31 according to the prior art 2 illustrated in FIG. 2, the capacitor 63 is of the three-terminal transmission line element type. In the capacitor 63, a conductive functional polymer film 11 is used as a solid electrolyte. A large number of minute holes are formed on a plate-like or foil-like valve-action metal by etching or the like to thereby increase the surface area of the valve-action metal by 200 times or so. An anode oxide film is formed on the area-increased valve-action metal at a central portion 33 thereof. The valve-action metal and the anode oxide film formed thereon constitute a valve-action metal anode body 7. As the valve-action metal, use can be made of tantalum, aluminum, niobium, or the like.

Then, the conductive functional polymer film 11 is formed so as to cover the anode body 7 at the central portion 33. Further, a graphite layer 13 is formed around the conductive functional polymer film 11, and a conductive layer 15 in the form of a silver paste layer is further formed around the graphite layer 13. In this manner, a cathode layer is formed. Thereafter, anode terminal metal plates 39a, 39b are respectively joined to ends 37a, 37b of the anode body 7 which are formed to extend outward continuously from the central portion 33 of the anode body 7 via portions 35 where resist layers 16, 16 are formed. The anode terminal metal plates 39a, 39b serve as anode terminals, respectively.

A thermal adhesive resin impregnated tape 41 is provided to cover the conductive layer 15 of the cathode on an upper side thereof, and a reinforcing metal plate 65 is further provided to cover the tape 41 on an outer side thereof. A thermal adhesive resin impregnated tape 45 having a through hole 47 is provided to cover the conductive layer 15 on a lower side thereof. After filling the through hole 47 with a conductive paste 49, a cathode terminal metal plate 67 is provided to cover the tape 45 including the conductive paste 49 so as to serve as a cathode terminal.

In this embodiment, an acrylic base member impregnated with an epoxy resin is used as the thermal adhesive resin impregnated tape. However, there is no particular limitation insofar as an adhesive is impregnated into a resin base member.

In this embodiment, the anode oxide film is formed on the valve-action metal to constitute the valve-action metal anode body 7, and then the conductive functional polymer film 11, the graphite layer 13, and the silver paste layer (conductive layer 15) are formed as the cathode layer on the anode body 7 in the order named, thereby to form the capacitor element. The thermal adhesive resin impregnated tape 41 having an outer periphery broader than the cathode area by an area corresponding to a length of L2=0.1 mm or more is stuck to the capacitor element on one side thereof, i.e. on the upper side thereof, so that the length of the tape 41 becomes longer than a length L1 of the cathode layer by at least L2.

Thereafter, the element reinforcing metal plate 65 applied with a stepping process is stuck to the tape 41. Herein, the stepping process is a process of providing a difference in level corresponding to a substantial thickness H of the cathode layer on the anode body 7 of the element, i.e. the total thickness of the conductive functional polymer film 11, the graphite layer 13, and the silver paste layer (conductive layer 15). Further, the thermal adhesive resin impregnated tape 45 having the through hole 47 for ensuring electrical conduction by means of the conductive paste 49 and having the foregoing area is stuck to the capacitor element on the other side thereof, i.e. on the lower side thereof.

Thereafter, the solderable cathode terminal metal plate 67 is stuck to the tape 45 including the conductive paste 49. The cathode terminal metal plate 67 is also applied with a stepping process that provides a difference in level corresponding to a thickness obtained by subtracting a thickness of the resist layer 16 from the substantial thickness H of the cathode layer, i.e. the total thickness of the conductive functional polymer film 11, the graphite layer 13, and the silver paste layer (conductive layer 15). Then, by carrying out a curing treatment under high temperature and pressure, all the outer periphery of the cathode layer of the element is covered with an insulating resin.

In this embodiment, use can be made of pyrrole, thiophene, or the like for the conductive functional polymer film 11. On the other hand, use can be made of a plate member made of copper, a copper-based alloy, a nickel alloy, or the like for the element reinforcing metal plate 65 and the cathode terminal metal plate 67. However, the plates 65 and 67 are not limited to such a plate member insofar as a plate member is made of a material of a terminal of an electronic component.

The capacitor element having subjected to the curing process is sandwiched between the insulating resin impregnated tapes 41 and 45 and between the metal plates 65 and 67 applied with the stepping process such that all the outer periphery of the cathode layer is fully covered with the insulating resin. Thus, invasion of oxygen from the exterior can be prevented. Therefore, oxidation of the conductive functional polymer film 11 being the electrolyte can be prevented to suppress deterioration of the electrical performance, particularly an increase in equivalent series resistance. Consequently, it is possible to achieve a thin-type surface-mount solid electrolytic capacitor that is stable, reliable, and excellent in high-temperature durability.

In the foregoing embodiment of this invention, the capacitor has the rectangular plate-like shape. However, it is readily understood that it may also have a disc shape, a button shape, a semicylindrical shape, or the like.

Further, in the foregoing embodiment of this invention, the description has been given about the three-terminal type surface-mount capacitor. However, it is readily understood that if a cathode layer is formed so as to cover one end of the valve-action metal anode body 7, it is possible to achieve a two-terminal type surface-mount capacitor having an anode terminal at one end and a cathode terminal at the other end.

According to this invention, it is possible to provide a non-cased thin-type surface-mount capacitor that can inhibit invasion of oxygen into the inside of the capacitor, and that is reliable and excellent in high-temperature durability.

The thin-type surface-mount capacitor according to this invention is applicable to an electrical capacitor of the type that is surface-mounted on a board such as a printed circuit board of an electronic component or an electrical component.

While this invention has thus far been described in conjunction with the preferred embodiment thereof, it will be readily possible for those skilled in the art to put this invention into practice in various other manners without departing from the scope set forth in the appended claims.

What is claimed is:

1. A thin-type surface-mount capacitor comprising:
    a capacitor element comprising an anode body in the form of a plate-like or foil-like valve-action metal that is area-increased, and a cathode layer including a solid electrolyte in the form of a conductive functional polymer film;
    thermal adhesive insulating resin impregnated tapes provided on both sides of said capacitor element, respectively; and
    an element reinforcing metal plate and a solderable cathode terminal metal plate that are stuck to said thermal adhesive insulating resin impregnated tapes, respectively, wherein a thermal adhesive insulating resin of said thermal adhesive insulating resin impregnated tapes is cured under high temperature and pressure, and wherein end portions of said element reinforcing metal plate located outward of said cathode layer and corresponding to said anode body are applied with a stepping process that provides a difference in level corresponding to a substantial thickness of said cathode layer.

2. A thin-type surface-mount capacitor according to claim 1, wherein end portions of said cathode terminal metal plate located outward of said cathode layer and corresponding to said anode body are applied with a stepping process that provides a difference in level corresponding to a substantial thickness of said cathode layer.

3. A thin-type surface-mount capacitor according to claim 1, wherein each of said thermal adhesive insulating resin impregnated tapes has an outer periphery broader than a cathode area of said capacitor element by an area corresponding to a length of 0.1 mm or more.

4. A thin-type surface-mount capacitor according to claim 1, wherein said thin-type surface-mount capacitor is of a two-terminal type in which said cathode layer is formed so as to cover one end portion of said anode body, and metal plates are connected to said cathode layer and said anode body, respectively, to form one cathode terminal and one anode terminal.

5. A thin-type surface-mount capacitor according to claim 1, wherein said thin-type surface-mount capacitor is of a three-terminal type in which said cathode layer is formed so as to cover a central portion of said anode body, and metal plates are connected to said cathode layer and both end portions of said anode body, respectively, to form one cathode terminal and two anode terminals.

6. A thin-type surface-mount capacitor according to claim 5, wherein said thin-type surface-mount capacitor is of a three-terminal transmission line type for use in a power circuit.

7. A thin-type surface-mount capacitor according to claim 1, wherein said valve-action metal contains at least one selected from tantalum, aluminum, and niobium.

8. A thin-type surface-mount capacitor according to claim 1, wherein said conductive functional polymer film contains at least one of pyrrole and thiophene.

9. A thin-type surface-mount capacitor according to claim 1, wherein said cathode layer includes a conductive paste layer formed on a graphite layer formed on said conductive functional polymer film.

10. A method of producing a thin-type surface-mount capacitor, comprising the steps of:

forming a capacitor element by using as an anode body a plate-like or foil-like valve-action metal that is area-increased, and by forming a cathode layer including a solid electrolyte being a conductive functional polymer;

sticking thermal adhesive insulating resin impregnated tapes to said capacitor element on both sides thereof, respectively;

sticking an element reinforcing metal plate and a solderable cathode terminal metal plate to said thermal adhesive insulating resin impregnated tapes, respectively;

applying a stepping process to portions of said element reinforcing metal plate located at outer ends of said cathode layer and corresponding to said anode body for providing a difference in level corresponding to a substantial thickness of said cathode layer; and curing a thermal adhesive insulating resin of said thermal adhesive insulating resin impregnated tapes under high temperature and pressure.

11. A method of producing a thin-type surface-mount capacitor according to claim 10, wherein the step of applying a stepping process further applies a stepping process to portions of said cathode terminal metal plate located at outer ends of said cathode layer and corresponding to said anode body for providing a difference in level corresponding to a substantial thickness of said cathode layer.

* * * * *